May 13, 1947.   H. J. WOLL   2,420,404
INDICATOR CIRCUIT FOR SIGNALS BELOW AUDIBILITY
Filed May 30, 1945
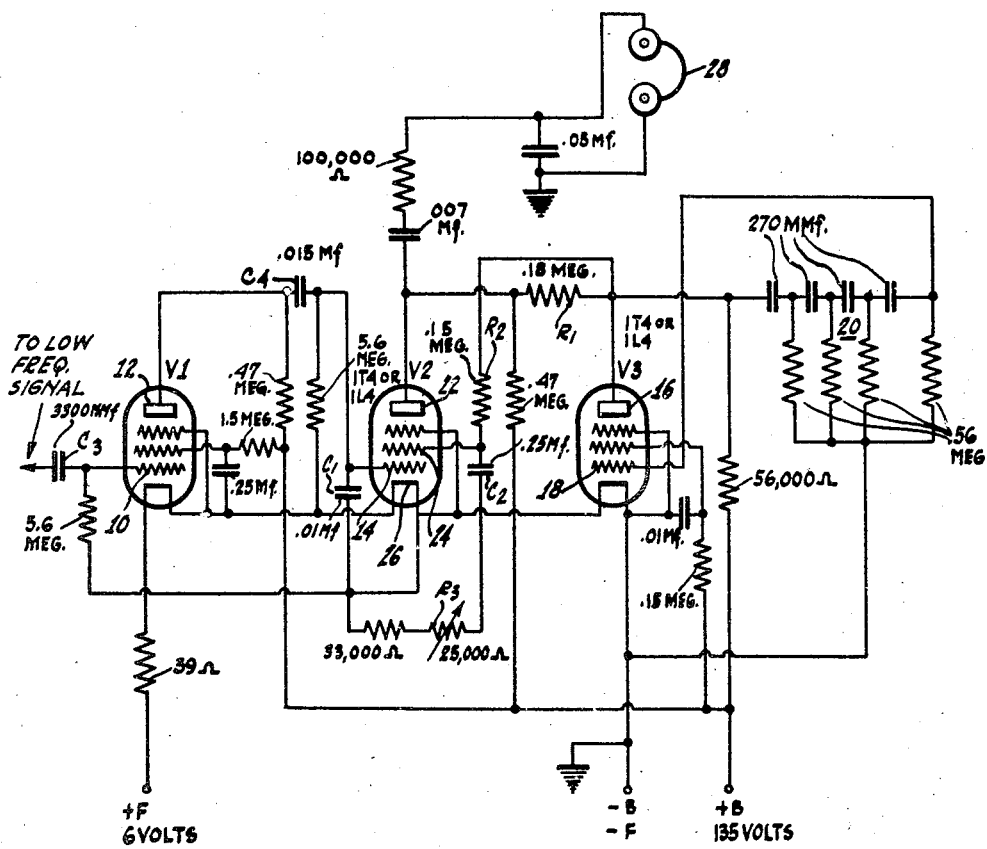
INVENTOR.
HARRY J. WOLL
BY
ATTORNEY Patented May 13, 1947

2,420,404

UNITED STATES PATENT OFFICE 2,420,404

INDICATOR CIRCUIT FOR SIGNALS BELOW AUDIBILITY

Harry J. Woll, Indianapolis, Ind., assignor to Radio Corporation of America, a corporation of Delaware Application May 30, 1945, Serial No. 596,693

4 Claims. (Cl. 177—352)

This invention relates to the detection of normally insensible signals and more particularly to a method of and means for providing an audible indication of a signal which has a frequency outside the normal audio range.

It is frequently desired to detect signals which, either because of their frequency or some other characteristic, cannot readily be appreciated by the senses. In one form of land mine detector, for example, a signal of this type is generated in response to the presence of a mine. The signal has a frequency which may vary between one-half and three cycles per second and, in any case, is well below the threshold of sensitivity of the human ear.

It is therefore an object of the invention to provide an indication of a signal which cannot normally otherwise be readily appreciated by the senses.

Another object of the invention is the provision of simple apparatus for detecting a signal of the character indicated.

It is a particular object of the invention to provide an audible indication of a signal of normally inaudible frequency.

According to the invention, these objects are achieved by generating a pair of signals, the presence of which may be readily indicated, balancing these signals against each other, disturbing the balance thus created by the inaudible or otherwise insensible signal to be indicated, and detecting the signal resulting from such unbalance. In one exemplification of the invention a pair of signals of audio frequency may be applied to the anode and screen grid, respectively, of an electron tube in such manner that the two signals balance each other and thereby cancel the flow of current through the indicating device. The signal to be indicated may then be applied to the control electrode of the tube, thereby disturbing the balance previously created, and the signal resulting from the change of space current in the tube caused by such unbalance may be detected by application to an appropriate transducer.

The invention may be better understood from the following description of an embodiment thereof, when read in conjunction with the accompanying drawing, the single figure of which is a circuit diagram of said embodiment, and shows the circuit values chosen for that embodiment.

The drawing shows three electron tubes, designated $V_1$, $V_2$ and $V_3$, respectively. These tubes may be identical pentodes of a type known as RCA IL4 or IT4, with the suppressor grid of each tube tied to its filamentary cathode.

The tube $V_1$ acts as an amplifier for the signal to be indicated, the signal being applied to the control electrode 10 of that tube by a coupling capacitor $C_3$. A capacitor $C_4$ couples the anode 12 of $V_1$ to the control electrode 14 of $V_2$ so that the output of the amplifier $V_1$ is applied to $V_2$. A capacitor $C_1$ is connected across the connection from $V_1$ to $V_2$.

The tube $V_3$ acts as an audio frequency oscillator, its anode 16 being connected to its control electrode 18 by a phase-shifting combination 20. In one embodiment of the invention, the circuit elements associated with the oscillator $V_3$ were chosen of such values as to provide a signal having a frequency of 1000 cycles per second.

The audio frequency output of the oscillator $V_3$ is applied to the anode 22 of $V_2$ by a resistor $R_1$ and also to the screen grid 24 of $V_2$ by a resistor $R_2$. The screen grid 24 is connected to the filamentary cathode 26 of $V_2$ by a blocking capacitor $C_2$ and a variable resistor $R_3$. As indicated in the drawing of the circuit diagram the blocking capacitor $C_2$ has a large value and this value is large enough to prevent any phase shift in the signal applied to the screen grid. A transducer, represented as a pair of headphones 28, is connected across the anode or output circuit of the tube $V_2$.

The operation of the circuit described is as follows: A signal, which may have a frequency of, say, 1000 cycles per second, is generated by the oscillator $V_3$ and applied to the anode and screen grid of $V_2$. The signal applied to the screen grid is approximately in phase with the signal applied to the anode; the screen grid, however, has an opposite effect on the current through the indicating device to that produced by the anode signal. The arrangement therefore tends to cancel the signal delivered to the transducer. The variable resistor $R_3$ is now adjusted to produce a null or a desired minimum signal. The combination of the tubes $V_2$ and $V_3$ and their associated circuit elements may be regarded as a balanced circuit in which the audio frequency signals applied to anode and screen grid, respectively, of $V_2$ are balanced against each other. No voltage appears between the plate and grid of $V_2$ and nothing is heard in the headphones 28. Alternately, the tube $V_2$ may be thought of as a normally closed electronic valve which does not permit any of the audio frequency signal generated by $V_3$ to pass to the headphones.

The signal to be indicated is now applied to the control electrode 10 of the tube V₁. This signal may be the transient produced in a land mine detector by the presence of a mine and may, as before mentioned, have a frequency of, say, from one-half to three cycles per second. The low frequency signal is amplified by V₁, and the shunting capacitor C₁ removes, or at least reduces, the high frequency response of the amplifier, thereby serving to minimize tube noise and microphonics.

If it were desired to provide an audible indication of a signal having a frequency above the normal audio range, the capacitor C₁ might be omitted.

The signal thus amplified and modified is now applied to the control electrode 14 of V₂. This disturbs the balance previously established in V₂ and changes space current in that tube. The signal appearing in the output circuit of V₂ resulting from the change of space current has a frequency of 1000 cycles per second and may be clearly heard in the headphones.

There has thus been described a method of providing a sensible indication of an otherwise insensible signal and means including a circuit for carrying that method into effect. A pair of sensible signals are generated and applied in such relation of magnitude and phase to an electronic circuit as substantially to balance each other. The balance thus created is disturbed by the signal to be indicated and the signal produced by the unbalancing is detected to provide a sensible indication of the presence of the otherwise insensible signal.

I claim as my invention:

1. The method of providing an audible indication of a signal which has a frequency outside the normal audio range by the aid of an electron tube which has at least one auxiliary electrode in addition to a cathode, an anode and a control electrode, said method including the steps of generating a signal within said range, dividing said last mentioned signal, applying the divided signals to said anode and auxiliary electrode respectively in such relation of magnitude and phase as substantially to cancel the flow of current through an indicating device connected to the output of said tube, applying the signal to be indicated to said control electrode, and detecting in said indicating device the signal resulting from the consequent change in space current occurring in said tube.

2. A circuit for providing an indication of a signal which has a frequency outside the normal audio range, said circuit including an audio frequency oscillator, an electron tube having at least one auxiliary electrode in addition to a cathode, an anode and a control electrode, connections for applying the output of said oscillator to said anode and said auxiliary electrode respectively including means for adjusting the magnitude of the output so applied to at least one of said two last-mentioned electrodes, connections for applying the signal to be indicated to said control electrode, and a detector for providing an indication of the signal resulting from the change in the flow of space current in said tube.

3. A circuit for providing an indication of a signal which has a frequency below the normal audio range, said circuit including an audio frequency oscillator, an electron tube having at least one auxiliary electrode in addition to a cathode, an anode and a control electrode, connections including a variable resistor for applying the output of said oscillator to said anode and said auxiliary electrode respectively, an amplifier for the signal to be indicated, connections from said amplifier to said control electrode, a capacitor connected across said last mentioned connections for reducing the high frequency response of said amplifier, and a detector for providing an indication of the signal resulting from the change in the flow of space current in said tube.

4. A circuit for providing an indication of a signal which has a frequency outside the normal audio range, said circuit including an audio frequency oscillator, an electron tube having at least one auxiliary electrode in addition to a cathode, an anode, and a control electrode, a detector for providing an indication of the signal resulting from a change of space current in said tube, connections including a variable resistor for applying the output of said oscillator to said anode and said auxiliary electrode respectively in such relation of magnitude and phase as to normally cancel current in said detector, and connections for applying the signal to be indicated to said control electrode whereby indications of said signal are generated in said detector.

HARRY J. WOLL.

REFERENCES CITED

The following references are of record in the file of this patent:

UNITED STATES PATENTS

| Number | Name | Date |
|--------|------|------|
| 1,615,636 | Langmuir | Jan. 25, 1927 |
| 1,567,566 | Brackett | Dec. 29, 1925 |
| 2,281,995 | Purlington | May 5, 1942 |
| 2,253,307 | Richter | Aug. 19, 1941 |